(12) United States Patent
Sadowsky

(10) Patent No.: US 7,295,634 B2
(45) Date of Patent: Nov. 13, 2007

(54) PORTABLE COMMUNICATION DEVICE AND METHOD THEREFOR

(75) Inventor: John S. Sadowsky, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 625 days.

(21) Appl. No.: 09/750,386

(22) Filed: Dec. 27, 2000

(65) Prior Publication Data

US 2002/0080893 A1 Jun. 27, 2002

(51) Int. Cl.
*H04L 25/08* (2006.01)
*H04B 1/10* (2006.01)

(52) U.S. Cl. .................................. 375/346; 375/350
(58) Field of Classification Search ............ 375/148, 375/247, 346, 150, 316, 350; 341/143; 455/76, 455/126; 348/21; 370/482
See application file for complete search history.

(56) References Cited

U.S. PATENT DOCUMENTS

| | | | | |
|---|---|---|---|---|
| 3,655,917 A | * | 4/1972 | Levine | 370/482 |
| 5,311,181 A | * | 5/1994 | Ferguson et al. | 341/143 |
| 5,392,042 A | * | 2/1995 | Pellon | 341/143 |
| 5,933,767 A | * | 8/1999 | Leizerovich et al. | 455/126 |
| 5,966,401 A | * | 10/1999 | Kumar | 375/150 |
| 6,362,762 B1 | * | 3/2002 | Jensen et al. | 341/143 |
| 6,577,674 B1 | * | 6/2003 | Ko et al. | 375/148 |
| 6,622,009 B1 | * | 9/2003 | Tolson | 455/76 |
| 6,633,618 B1 | * | 10/2003 | Kuiri et al. | 375/346 |
| 6,639,946 B2 | * | 10/2003 | Wu et al. | 375/247 |
| 6,678,340 B1 | * | 1/2004 | Khlat et al. | 375/350 |
| 6,697,098 B1 | * | 2/2004 | Wang | 348/21 |

OTHER PUBLICATIONS

Sklar, B; Digital communications, Fundamentals and Applications; Chapter 3, p. 128-129; Copyright 1988, Prentice Hall.*
www.eecg.toronto.edu/~kphang/ece1371/rfreceiver.pdf.*

* cited by examiner

*Primary Examiner*—Don N. Vo
(74) *Attorney, Agent, or Firm*—Kenneth J. Cool

(57) ABSTRACT

Briefly, in accordance with one embodiment of the invention, a portable communication device includes a quantization unit comprising an analog-to-digital converter and a signal generator. The output signal of the analog-to-digital converter may be adjusted to provide a feedback signal that is generated from by the signal generator and subtracted from an IF input signal.

22 Claims, 3 Drawing Sheets

PORTABLE COMMUNICATION DEVICE AND METHOD THEREFOR

BACKGROUND

Wireless communication devices (e.g., a cellular phone) have an antennae that is use to receive an analog, radio frequency (RF) signal. The RF signal may contain encoded information embedded into a carrier signal. It is the purpose of the receiver to extract the encoded information from the signal which may involve accounting for the influence of noise and interference from other RF signals. A sequence of filters may be used to isolate the encoded information. An intermediate frequency (IF) signal processing unit may be used to further extract the encoded information signal from the IF signal. The Radio/Analog signal processing unit may comprise a sequence of filters, multipliers, oscillators, etc., that may be used to isolate the portion of the IF signal comprising the encoded information. An analog-to-digital (ADC) converter may then be used to convert the analog encoded signal to a digital signal so that the information may be processed by digital circuitry, such as a microprocessor.

However, these systems may involve the use of complicated circuitry that may increase the overall cost of the wireless device. Thus, there is a continuing need for better ways to extract the encoded information in a wireless communication.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
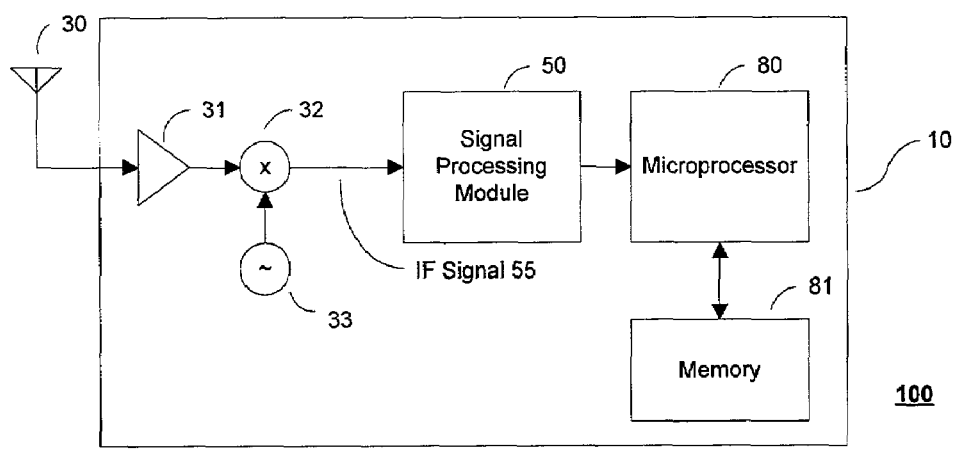
FIG. 1 is a high-level block diagram representation of a portable communication device in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may also mean that two or more elements are in direct physical or electrical contact. However, "coupled" may also mean that two or more elements are not in direct contact with each other, but yet still co-operate or interact with each other.

It should be understood that the present invention may be used in a variety of applications. Although the present invention is not limited in this respect, the circuits and techniques disclosed herein may be used in many apparatuses such as in the transmitters and receivers of a radio system. Radio systems intended to be included within the scope of the present invention include, by way of example only, cellular radiotelephone communication systems, two-way radio communication systems, one-way pagers, two-way pagers, personal communication systems (PCS), personal digital assistants (PDA's) and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, Time Division Multiple Access (TDMA) systems, Extended-TDMA (E-TDMA) cellular radiotelephone systems, and the like.

Turning to FIG. 1, an embodiment 100 in accordance with the present invention is described. Embodiment 100 may comprise a portable device 10 such as a mobile communication device (e.g., cell phone), a two-way radio communication system, avionics systems, government and military radios, radio navigation systems (aircraft, ships, etc.), space based radio systems, radio test equipment (such as channel sounders), cable distribution systems, commercial products such as television sets, broadband data radio systems, a one-way pager, a two-way pager, a personal communication system (PCS), a portable computer, or the like. Although it should be understood that the scope and application of the present invention is in no way limited to these examples.

Embodiment 100 may include an antennae 30 that may be used to receive a radio frequency (RF) signal 15. Although the scope of the present invention is not limited in this respect, RF signal 15 may comprise encoded information and a carrier signal. In the embodiments described herein, it should be understood that RF signal 15 is not intended to be limited to a signal of a particular frequency range, amplitude, or bandwidth. RF signal 15 may be of various frequencies depending, at least in part, on the frequency used in a particular wireless communication system. For example, RF 15 signal may have a frequency ranging from about 800 MHz to 950 MHZ, from about 1.5 GHz to 2.5 GHz, etc. It should further be understood that RF 15 signal may comprise an in-phase (I) component and a quadrature (Q) component modulated on the RF carrier, although for simplicity, RF signal 15 is referred to hereinafter as a one signal. The unmodulated I and Q signals are called the baseband signal.

Portable communication device 10 may also include a multiplier 32 that is used to mix the output of a low-noise amplifier (LNA) 31 and the output of an oscillator 33, if desired. Although the scope of the present invention is not limited in this respect, multiplier 32 may provide an intermediate frequency (IF) signal that, in turn, is processed by a signal processing module 50. Oscillator 33 may be a tunable oscillator that, in conjunction with LNA 31, may be used to select a portion of the received RF signal received that is referred to as the IF signal. However, it should be understood that the use of LNA 31, and oscillator 33 should be considered optional. In alternative embodiments, the IF signal may be the same or similar to the received RF signal. Additionally, other filtering or processing techniques may be used to select a portion of the RF signal as the IF signal. Although the scope of the present invention is not limited in this respect, IF signal 55 may be represented by the expression $$x^I(t)\cos(2\pi f_{IF}t) - x^Q(t)\sin(2\pi f_{IF}t)$$

where $x^I(t)$ and $x^Q(t)$ are the I and Q baseband signals and $f_{IF}$ is the intermediate frequency.

As explained in more detail below, signal processing module 50 may be used to further isolated the encoded information within the IF signal and provide a digital output signal that may be used by a microprocessor 80 (e.g. a digital signal processor (DSP), a general purpose microprocessor, application specific signal processing (ASSP) logic circuits, etc.) to further interpret or process the encoded information received by portable communication device 10.

As shown in FIG. 1, embodiment 100 may also include a memory 81, such as a non-volatile memory, that may be used to store the instructions to be executed by processor 80. In alternative embodiments, memory 81 may be used to store instructions that, when executed by processor 80, perform all or some of the operations of signal processing module 50. It should be understood that portable device 10 may also include other components not shown in FIG. 1, such as a display, transmitter, etc., although the scope of the present invention is not limited by the inclusion or exclusion of such components.

Figure 2:
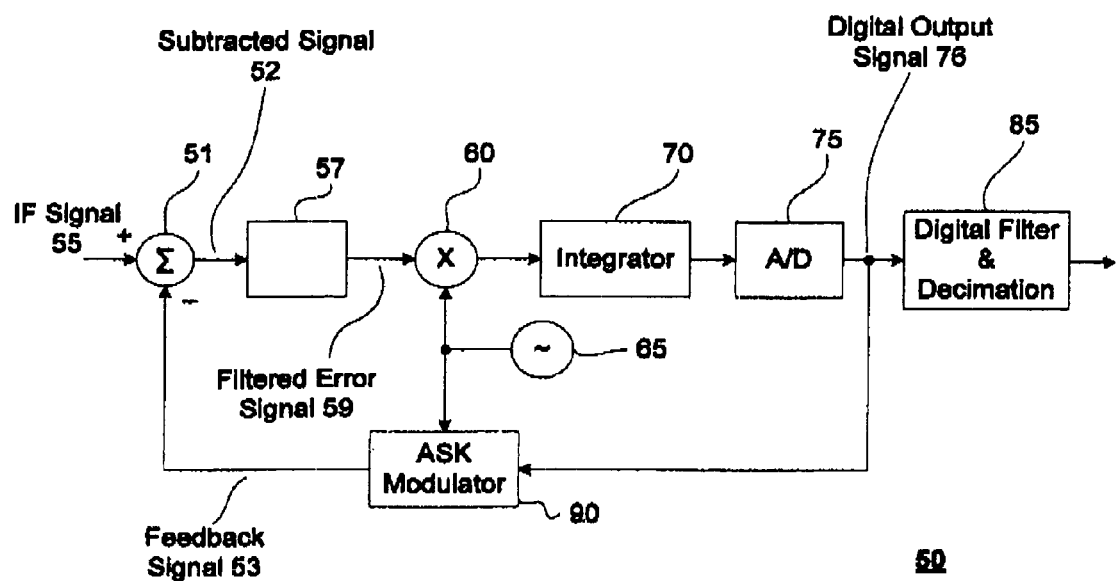
FIGS. 2-3 are block diagram representations of a portable communication device in accordance with alternative embodiments of the present invention.

FIG. 2, is a block diagram of at least some of the components of signal processing module 50 in accordance with a particular embodiment of the present invention. As shown, a subtractor 51 may be used to subtract a feedback signal 53 from the IF signal 55. As explained in more detail below, feedback signal 53 may be generated by signal processing module 50 so that it roughly approximates IF signal 55 over the bandwidth of interest. For example, signal processing module 50 may dynamically change feedback signal 53, based at least in part of the encoded information of IF signal 55, so that the difference between IF signal 55 and feedback signal 53 is reduced over the frequencies containing the encoded information. Thus, subtractor 51 may provided a subtracted signal 52, which as explained below, may be used by an integrator 70 and/or an analog-to-digital (A/D) converter 75 to generate feedback signal 53. It is thus seen that, in this embodiment, the digital output signal 76 produced by the A/D converter 75 is feedback to produce, at least in part, feedback signal 53. Feedback signal 53 may be provided by an ASK modulator 90. This may result in a feedback quantization system in which A/D converter 75 is inside of a feedback loop created by feedback signal 53.

Signal processing module 50 may optionally comprise a filter 57 that may be used to further select a portion of subtracted signal 52. For example, filter 57 may be used to select the frequency range (e.g. bandwidth) of subtracted signal 52 that is desired or of interest. More particularly, subtracted signal 52 may comprise components having frequencies that are higher or lower than the center frequency, $f_c$, of interest. This may be due to such factors as system noise or other RF transmissions that have frequencies close to the frequency of the carrier signal intended for portable device 10.

Accordingly, filter 57 may be used to filter out or remove the portion of subtracted signal 52 that is not associated with the encoded information of IF signal 55 or RF signal 15 (see FIG. 1). Thus, filter 57 may optionally be used to provide a filtered signal 59. As explained below, in this particular embodiment, although the scope of the present invention is not limited in this respect, signal processing module 50 generates feedback signal 53 so that the difference between IF signal 55 and feedback signal 53 over at least a portion of the bandwidth of filtered signal 59 is reduced.

A multiplier 60 may be used to multiply filtered signal 59 with a signal from an oscillator 65, although the scope of the present invention is not limited in this respect. For example, oscillator 65 may generate a signal represented by the expression $2\cos(2\pi f_{IF}t)$. In this embodiment, multiplier 60 and oscillator 65 may be used to extract the in-phase part of IF signal 55.

This signal may then be integrated with an integrator 70 to perform "spectral shaping." Integrator 70 may be used to enhance the signal tracking and quantization noise rejection characteristics of the feedback loop. This may result in spectral shaping of the quantization noise introduced by A/D converter 75. When properly tuned, a significant portion of the quantization noise may lie outside of the frequency band containing the desired in-phase signal; hence the out-of-band noise may be removed by digital filter 85.

A/D converter 75 may be coupled to receive the output of integrator 70, an analog signal, and provide a digital signal output that may be used to represent at least a portion of the encoded information contained within the received RF signal 15 (see FIG. 1). In this particular embodiment, A/D converter 75 may be single-bit converter meaning digital output signal 76 is a single bit. Digital output signal 76 may be an over-sampled representation of IF signal 55. The amount of over-sampling may be varied as desired. For example, A/D converter 75 may sample at a rate approximately equal to the Nyquist rate (e.g., twice the bandwidth of the baseband in-phase and quadrature signals.), or it may be an oversampled system for which the sample rate is several times faster than the Nyquist rate.

However, it should be understood that the scope of the present invention is not limited to embodiments where the output of A/D converter is a single bit. In alternative embodiments, A/D converter 75 may have two or more bits to further reduce the amount of noise represented in digital output signal 76. In either event, digital output signal 76 represents a quantized signal that is determined, at least in part, on the input signal (e.g., IF signal 55). Although the scope of the present invention is not limited in this respect, digital output signal 76 may represent at least a portion of the encoded information contained within IF signal 55. Accordingly, digital output signal 76 may be provided to a digital filter and decimation unit 85 that may be used to further filter the content of digital output signal 76. Digital filter and decimation unit 86 may also be used to reduce the frequency bandwidth of digital output signal 76, and hence, reject out-of-band quantization noise, before being provided to other digital logic (e.g., processor 80 of FIG. 1). After filtering, a decimator may reduce the sampler rate to a rate significantly closer to the Nyquist rate.

Digital output signal 76 may also be used by a signal generator 90 to determine, at least in part, feedback signal 53. In this particular embodiment, signal generator 90 may comprise an amplitude shift key (ASK) modulator, although other modulators and components may also be used. As the A/D converter 75 may be a 1 bit A/D, the ASK modulator may reduce to a binary phase shift key (BPSK) modulator. As shown, signal generator uses or modulates digital output signal 76 and the output of oscillator 65 to generate feedback signal 53. For example, if digital output signal 76 is represented by a single bit, the bit applied to a BPSK modulator may creates a signal that is either in-phase with the local oscillator or about 180° out-of-phase with the output of oscillator 65. Although the scope of the present invention is not limited in this respect, feedback signal may be represented by the expression $x'(t)\cos(2\pi f_{IF}t)$. Thus, feedback signal 53 may represent a reconstructed version of the in-phase component of the IF signal 55.

However, it should be understood that feedback signal 53 and IF signal 55 may not be exact due to a variety of reasons (e.g. the noise associated with various components of signal processing module 50, "spectral shaping" performed by integrator 70, quantization error associated with A/D converter 75, etc.). In addition, signal processing module 50 may dynamically adjust the value of digital output signal 76 so that difference between IF signal 55 and feedback signal 53 is reduced over the frequency or frequencies of interest. This reduction may be reflected in the subtracted signal 52 that is provided by subtractor 51. Since digital output signal 76, and feedback signal 53, are determined, at least in part, on subtracted signal 52, signal processing module 50 is adapted to adjust digital output signal so that feedback signal 53 may track or follow IF signal 55. Consequently, digital output signal 76 may accurately represent the encoded information within RF signal 15 (see FIG. 1).

It should be understood that a signal processing module in accordance with the present invention need not have all of the components shown in FIG. 2. Likewise, alternative embodiments of the present invention may include addition components or devices within signal processing module 50. For example, signal processing module 50 may include additional filters, multipliers, oscillators, additional integrators for higher order feedback loops, etc). More particularly, it should be understood that signal processing module 50 may comprise additional components in the signal path of integrator 70, A/D converter 75, and/or signal generator 90.

Figure 3:
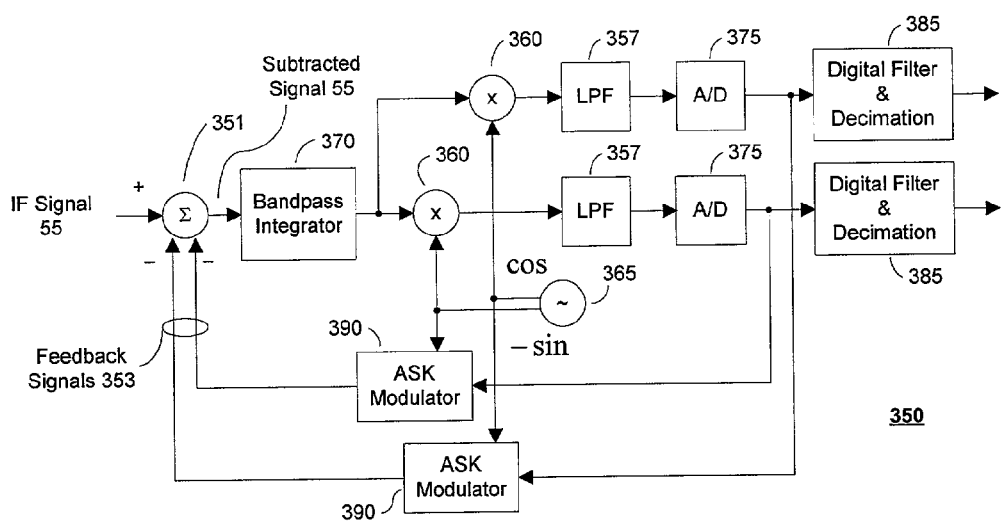

Referring now to FIG. 3, a signal processing module 350 in accordance with an alternative embodiment of the present invention is provided. One notable difference with this embodiment is that signal processing module 350 may comprise two or more signal paths having a feedback loop. For example, the signal paths may have a multiplier 360, a filter 357, an A/D converter 375 and a signal generator 390. This arrangement may desirable so that one signal path may provide the in-phase (I) component of the encoded information as the other path provides the quadrature (Q) component. These signal components may be the signals $X^I(t)$ and $X^Q(t)$, respectively, in the expression $x^I(t)\cos(2\pi f_{IF}t) - x^Q(t)\sin(2\pi f_{IF}t)$ for IF signal 55. In doing so, a local oscillator 365 having dual outputs may be coupled to signal generators 390 such that the cos ( ) component may be provided to one signal generator while the sin ( ) component is provided to the other.

Alternatively, or in addition to, the use of two or more signal paths within signal processing module 350, integrator 370 may be arranged such that it is prior to multipliers 360. This may be desirable so that subsequent digital filtering may extract the desired signal and reject the out-of-band quantization noise. By placing the bandpass integrator 370 before the multipliers 360, these noises may be spectrally shaped by the feedback loop in such a manner that most of the noise power is outside of the bandwidth of the desired baseband signal. Since RF and/or IF multipliers (often called mixers or down converters) may be particularly noisy circuits, this embodiment may be manufactured with a lower cost.

It should be understood that bandpass integrator 370 may be any filter having a relatively high gain within the bandwidth of IF signal 55. Bandpass integrator 370 may have a transfer function $H(j\omega) \propto 1/(S^2 + \omega_{IF}^2)$. Alternatively, bandpass integrator 370 may be a finite time integrator that may be implemented using a surface acoustic wave (SAW) filter, or it may be a RLC circuit implemented using integrated or discrete resistors, inductors, capacitors and/or active elements. In addition, bandpass integrator 370 may be designed to provide additional adjacent channel interference rejection relative to that achieved by the ideal bandpass integrator transfer function.

An advantage of this IF feedback architecture is that by placing IF components (e.g.: IF filters, multipliers, oscillators, etc.) after integrator 370, may allow noise spectral shaping to be applied to noises generated by IF sources, as well as to quantization noise generated by A/D converter 375. Radio and analog components may be costly components in portable communications devices. This architecture may provide additional choices and engineering trades in portable radio receiver design resulting in the use of lower cost radio and IF components where otherwise more expensive parts would be used.

While certain features of the invention have been illustrated and described herein, many modifications, substitutions, changes, and equivalents will now occur to those skilled in the art. For example, the use of a feedback loop may be used in the transmitter portion as well as in the receiver portion of a wireless communication device. It is, therefore, to be understood that the appended claims are intended to cover all such modifications and changes as fall within the true spirit of the invention.

The invention claimed is:

1. A portable communication device comprising:
    an analog-to-digital converter to provide a digital output signal;
    a signal generator coupled to the digital output signal to generate a feedback signal;
    wherein the portable communication device is adapted to subtract the feedback signal from an intermediate frequency (IF) signal; and
    a multiplier to extract an in-phase part of the IF signal after subtraction of the feedback signal; and further comprising:
    a filter adapted to provide a filtered signal with a bandwidth to the multiplier, wherein the signal generator generates a feedback signal that reduces the difference between the IF signal and the feedback signal over at least a portion of the bandwidth of the filtered signal; and
    an integrator coupled to the multiplier and adapted to perform spectral shaping of the extracted signal;
    wherein the signal generator comprises an amplitude shift key modulator.

2. The portable communication device of claim 1, wherein the portable communication device is adapted to change the digital output signal to reduce the difference between the IF signal and the feedback signal.

3. The portable communication device of claim 1, further comprising a local oscillator coupled to the modulator.

4. The portable communication device of claim 3, wherein the digital output signal consists of a bit coupled to the signal generator such that the signal generator generates a feed back signal that is either in-phase with the local oscillator or about 180° out of phase with the local oscillator.

5. The portable communication device of claim 3, wherein the digital output signal comprises at least two bits.

6. The portable communication device of claim 1, wherein the portable communication device is adapted to receive an input signal and the digital output signal represents an over-sampled version of the input signal.

7. An apparatus comprising:
  a subtractor adapted to subtract a feedback signal from an intermediate frequency (IF) signal to provide a subtracted signal;
  a multiplier to isolate a portion of the subtracted signal having encoded information; and
  a signal generator to provide the feedback signal determined, at least in part, on the isolated portion of the subtracted signal wherein the signal generator comprises an amplitude shift key modulator.

8. The apparatus of claim 7, further comprising an integrator coupled to receive the subtracted signal.

9. The apparatus of claim 7, further comprising an oscillator coupled to the multiplier.

10. The apparatus of claim 7, further comprising an analog-to-digital converter to provide a digital output signal, wherein the feedback signal is determined, at least in part, on the digital output signal.

11. The apparatus of claim 7, wherein the signal generator comprises a modulator.

12. The apparatus of claim 11, wherein the modulator is coupled to a local oscillator.

13. The apparatus of claim 7, further comprising an antenna adapted to receive a radio frequency (RF) signal.

14. The apparatus of claim 13, wherein the RF signal is the IF signal.

15. A method comprising:
  receiving an input intermediate frequency (IF) signal and generating a quantized signal determined, at least in part, on the input IF signal;
  subtracting a feedback signal from the input IF signal to provide a subtracted signal; and
  multiplying the subtracted signal by an oscillator signal to generate a baseband signal for quantization; and further comprising:
  amplitude shift key modulating the digital output signal to provide the feedback signal.

16. The method of claim 15, further comprising generating the feedback signal with the quantized signal.

17. The method of claim 16, wherein generating a quantized signal includes converting at least a portion of the base band signal with an analog-to-digital converter to provide a digital output signal.

18. The method of claim 17, further comprising modulating the digital output signal to provide the feedback signal.

19. The method of claim 15, further comprising integrating the subtracted signal.

20. An article comprising: a storage medium having stored thereon instructions, that, when executed by a computing platform, result in:
  receiving an input intermediate frequency (IF) signal and generating a quantized signal determined, at least in part, on the input IF signal;
  subtracting a feedback signal from the input IF signal to provide a subtracted signal; and
  extracting an in-phase portion of the subtracted signal for quantization; and further comprising:
  amplitude shift key modulating the digital output signal to provide the feedback signal.

21. The article of claim 20, wherein the instructions, when executed, further result in converting at least a portion of the extracted signal with an analog-to-digital converter to provide a digital output signal.

22. The article of claim 20, wherein the instructions, when executed, further result in integrating the subtracted signal.

* * * * *